United States Patent
Walter et al.

[11] Patent Number: 6,134,785
[45] Date of Patent: Oct. 24, 2000

[54] METHOD OF FABRICATING AN ARTICLE OF MANUFACTURE SUCH AS A HEAT EXCHANGER

[75] Inventors: Robert J. Walter; James L. Yuen, both of Thousand Oaks; Gunes M. Ecer, Moorpark, all of Calif.

[73] Assignee: The Boeing Company, Seal Beach, Calif.

[21] Appl. No.: 07/884,356

[22] Filed: May 18, 1992

[51] Int. Cl.$^7$ ...................................................... B23P 15/26
[52] U.S. Cl. ...................................... 29/890.054; 427/455
[58] Field of Search ....................... 29/890.039, 890.041, 29/890.054; 427/455

[56] References Cited

U.S. PATENT DOCUMENTS

| | | | |
|---|---|---|---|
| 3,015,157 | 1/1962 | Reynolds et al. | 29/890.041 |
| 3,044,160 | 7/1962 | Jaffee | 29/890.054 |
| 4,582,678 | 4/1986 | Niino et al. | 419/8 |
| 4,676,876 | 6/1987 | Frankle | 204/9 |
| 4,707,225 | 11/1987 | Schuler et al. | 204/9 |
| 5,121,535 | 6/1992 | Wittenauer et al. | 29/423 |

FOREIGN PATENT DOCUMENTS 292595  8/1991  Germany ................................ 427/455

OTHER PUBLICATIONS

PCT WO/01339, Mar. 1985, 29/890.039.

*Primary Examiner*—Harold J. Tudor
*Attorney, Agent, or Firm*—David C. Faulkner; Harry B. Field

[57] ABSTRACT

A method for the manufacture of articles such as heat exchangers, heat absorbers, thermal skins, rocket engine components and the like which method comprises providing a substrate or mold, etching or cutting cooling channels therein, filling said channels and processing to form a part which is then fabricated into the final article. In the production method a unique filler or core material comprising a strontium composition is utilized thus rendering a product of high quality and net-shape finish.

7 Claims, 1 Drawing Sheet

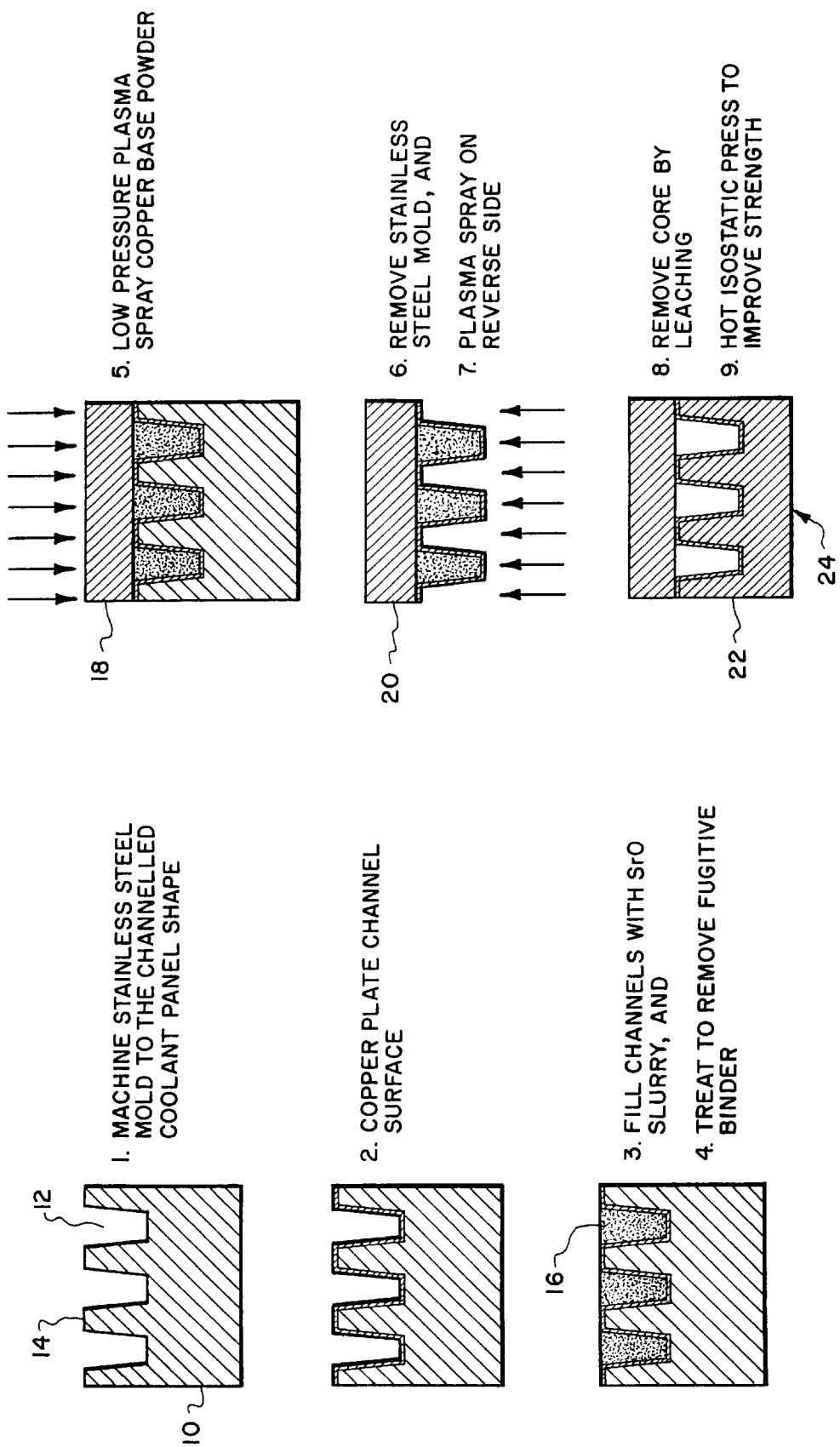

METHOD OF FABRICATING AN ARTICLE OF MANUFACTURE SUCH AS A HEAT EXCHANGER

STATEMENT OF GOVERNMENT INTEREST

The Government has rights in this invention pursuant to Contract No. F33657-87-C-2214 awarded by the U.S. Department of the Air Force.

BACKGROUND OF THE INVENTION

1. Field of the Invention

This invention relates to a method of producing an article of manufacture such as channels in a heat exchanger for use in engine combustors, heat sinks and the like.

2. Description of Related Art

U.S. Pat. No. 4,707,225 describes corrosion-resistant cooling channel construction by controlled electro-deposition of select materials onto a wall substrate of a combustion chamber. In the formation of the cooling channel construction, open channels are filled with a meltable substance such as a wax composition having a melting point of from about 90° C. to about 97° C. During this process, the meltable substance is removed by heating followed by final preparation of the cooling channel construction.

U.S. Pat. No. 4,676,876 describes a method for the manufacture of components such as heat exchangers. In this process, a cooling canal provided in a base structure is filled with an electrically conducting filler comprising a flexible and elastically stretchable profiled rope. Following preliminary component manufacturing steps, the rope is pulled out of the formed cooling canal defining a cooling channel in the manufactured component.

U.S. Pat. No. 4,582,678 describes a method for producing rocket combustors having a cooling wall of channel construction. In this method, a filler material useful in the manufacturing process comprises a meltable metal the removal of which is caused by heating it to temperatures in the range of 100° C. to 250° C. The utilization of the metal filler is limited, however, by its hardness and wetability with respect to a copper on the surface of the grooves forming the cooling section of the channel construction.

In the case of methods formally used which utilized a wax or the like as the filler, a drawback has been recognized in that during molding of the final article, the wax is often deformed resulting in inconsistent cooling channels being formed in the channel construction.

Further, the aforesaid metallic filler has additional drawbacks in that the removal of the metallic filler is often incomplete requiring additional machining of the channel components; said mechanical removal thereof proving very difficult and often occasioning imperfections in the channel construction leading to impaired cooling characteristics and possible breakdown during operation of the cooling element.

However, there remains a need for a high temperature dissolvable filler material that can be used for producing heat exchangers by plasma spraying. For example, the above filler materials can be used for electroform channel closeouts which are fabricated at or near ambient temperature. Electroforming is however limited mainly to pure metals and certain binary alloys such as electroformed Ni—Co. On the other hand most structural alloys cannot be electro-deposited. This includes the highly versatile NARloy-Z (or Cu-3w/oAg-0.5w/oZr) used for construction of rocket engine combustors and the iron and nickel base superalloys employed extensively in jet and rocket engines. The most feasible method of closing out channels with these alloys is by plasma spraying. Plasma spraying involves deposition of the molten metal and requires heating the substrate to within several hundred degrees of the melting temperature of the deposited metal. The channel filler material thus must be able to withstand the high deposition temperature without melting and must also be able to be stripped from the closed out channels without damaging the part.

Stripping without damaging the part is a difficult requirement because most elevated temperature materials are chemically very stable and require very strong concentrated acids or molten salts to dissolve if they can be dissolved at all. These high temperature material solvents also dissolve virtually all metals used in hardware construction. The present invention describes a high temperature material that can withstand the plasma spray processes without reacting with the deposited alloys and can be dissolved after spraying without damaging the plasma sprayed part.

OBJECTS OF THE INVENTION

Accordingly, an object of the present invention is to provide a method of fabricating an article of manufacture such as heat exchangers or heat sinks useful in engine combustors, heat absorbers, thermal skins, rocket engines and the like.

Another object of the invention is to provide a method of fabricating hardware with internal channels.

Yet another object of the invention is found in the utilization of a leachable filler composition adapted to the aforesaid manufacturing process.

SUMMARY OF THE INVENTION

Principally, this invention is a method of producing or fabricating an article of manufacture such as a heat exchanger, heat absorber, thermal skin, or rocket engine component, such as a rocket engine combustion chamber wall. In the process of the present invention, a mold is prepared in which cooling passages or channels are machined having a predetermined geometry (i.e., width and depth, angle of side walls, with and without fins). Following the formation of the channels in the mold, said channels are then plated with a copper alloy to a predetermined thickness. Thereafter, the channels are filled with a leachable filler composition, the mold containing the filler can be baked to remove fugitive binder from the filler and an outer surface of copper alloy applied by plasma spray. The filler composition is then removed and the resulting article is hot isostatic pressed to render the article of manufacture.

BRIEF DESCRIPTION OF THE DRAWING

FIG. 1 depicts the step-wise sequential stages in preparing an article of manufacture according to the present invention.

DESCRIPTION OF THE PREFERRED EMBODIMENTS

In FIG. 1 is shown the step-wise, near-net shape forming of coolant panels and the like via low pressure plasma spray processes utilizing a leachable strontium composition core.

In the process or method of the present invention, an article or mold 10 is provided which is machined to form channels 12 therein such that the channels are separated by lands 14. Following the machining step, the lands and channels are then copper-plated. Electrodeposited copper provides an advantage of exceptionally high thermal conductivity which is an important material characteristic in heat exchangers intended for high heat flux applications. It can also be applied with or without surface activation pretreatment. If it is plated without activation pretreatment, the electrodeposited copper will not adhere to the mold. Subsequentially, the channels are filled with a strontium composition forming cores 16 within the channels.

Next, the mold thus prepared is exposed to ambient temperature air for about 30 minutes to remove any binder contained in the core of filler composition. Following binder removal, the strontium composition is sintered in the mold at 1400° F. to 1700° F. for 10 minutes to 15 minutes in an air/$CO_2$ environment. A low pressure plasma spray is utilized to form a copper alloy outer surface 18 such as with copper alloy powder, onto the mold with the filled channels. The mold 10 is then removed leaving an assembly 20 consisting of the copper coated channel containing the strontium composition core 16 and plasma sprayed deposit outer surface 18 previously applied over the filled channels and lands.

Next, a low pressure plasma spray is directed such that an alloy base 22 e.g. a copper alloy of a predetermined thickness or a copper alloy graded to transition to another structural alloy is applied to the assembly 20. This alloy base 22 can be graded to transition to another structural alloy.

A major advantage of the low pressure plasma spray processes is its versatility in varying the composition as the deposit is being sprayed. For example, the outer surface 20 of the heat exchanger may require a high thermal conductivity material that has excellent thermal fatigue resistance; but the channel lands 14 and backside structure 22 may require strength and fatigue resistance. Thus a higher strength material may be deposited in these areas by progressively grading the composition as the deposit is built-up until the desired composition is established. By employing this capability of producing graded composition, transition zones can be produced for welding manifolds to the heat exchangers. This would allow for a gradual transition in mechanical and thermophysical properties over a large volume of material minimizing the problems associated with dissimilar metal welds.

Thereafter the strontium composition is removed from the channels by dissolving with deionized water or dilute (10%) HCl. Hot isostatic pressing (HIP) can be employed to reduce porosity and improve the integrity of the part or article of manufacture 24.

In practicing this embodiment of the invention, the following steps are taken:

1. Prewetting the $SrCO_3$ with a volatile organic solvent such as acetone and then puttying the wetted powder into the channels. An alternate step is to press unwetted powder in the channels followed by wetting and repressing to densify.

2. Sintering of $SrCO_3$ powder. Sintering is performed by heating the material in an air-$CO_2$ environment. This can be accomplished by simply flowing a stream of $CO_2$ into an air furnace. The concentration of $CO_2$ in air is not critical, and it only needs to be sufficient to increase the $CO_2$ slightly above that in atmospheric air. The sintering temperature-time can range between 15 minutes at 1500° F. to about 5 minutes at 1800° F. The preferred sintering procedure is exposure to 1700° F. for 5 minutes duration.

3. Sanding of the filled channels. Any rough surface area can be easily removed by sanding with fine grit sand paper to obtain a smooth surface for plasma spraying.

4. Low pressure plasma spraying. The channels are closed out by low pressure plasma spraying. In this invention, the part was preheated in a low pressure plasma spray (LPPS) chamber to 1800° F. and copper alloy plasma sprayed to close out the channels.

5. Low pressure plasma spraying the reverse side. A non-bonded coating was applied to the channel cavities. At this point the mold is separated from the plasma sprayed outer surface channel assembly, and the reverse side plasma sprayed to develop a backside structure of a predetermined thickness.

6. Leaching the $SrCO_3$ channel filler material. This is accomplished using either $DIH_2O$ or dilute (10%) HCl. Heating the leaching solution from ambient to about 90° C. increases the leaching rate by almost a factor of 10.

7. Hot isostatic pressing. Porosity in the plasma spray part can be healed by hot isostatically pressing (HIP).

In practicing the method of the present invention, it is to be understood that the strontium composition may be selected from strontium oxide, strontium carbonate and mixtures thereof. In preparing the core or filler material utilized in the method, the strontium composition is acetone-wetted when initially introduced into the copper alloy-coated channels. In order to remove the fugitive binder as previously mentioned, the substrate or mold having the channels filled with the core material is exposed to ambient temperature air to remove the acetone binder.

An alternative approach in producing the heat exchanger containing internal channels consists of starting with an opened channeled structure fabricated with the desired alloy composition. The opened channelled structure can be produced by processes such as a) machining wrought stock, b) casting, or c) by machining deposits produced by plasma spray or electrodepositions. The channels are filled with a leachable core material (Step 3 of FIG. 1). This would then be followed by steps 4, 5, 8 and 9 of FIG. 1 to complete heat exchanger fabrication.

It will, of course, be realized that various modifications can be made in the process of the present invention without departing from the spirit thereof. Accordingly, it should be understood that within the scope of the appended claims, the invention may be practiced otherwise than as specifically illustrated and described.

What is claimed:

1. A method of fabricating an article of manufacture comprising:

(a) machining a mold to form channels which are separated by lands;

(b) coating said mold and channels with a copper alloy to a predetermined thickness;

(c) filling the copper alloy channels of said mold with a strontium composition;

(d) plasma spraying said filled channels and lands with a copper alloy forming an outer surface;

(e) removing said mold and leaving a part consisting of the copper alloy coated channel containing said strontium composition and an outer surface, consisting of the plasma sprayed copper alloy of step (d), over the filled channels and lands;

(f) directing a low pressures plasma spray to said part to develop a backside structure of a predetermined thickness;

(g) removing the strontium compound from the channels; and (h) hot isostatic pressing of the part to improve properties and render the article of manufacture.

2. The method of claim 1 wherein the strontium composition is selected from strontium oxide, strontium carbonate and mixtures thereof.

3. The method of claim 1 wherein the strontium composition is removed from said channels by dissolving the composition with deionized water.

4. The method of claim 1 wherein the strontium composition is removed from said channels by dissolving the composition with 10% HCl.

5. The method of claim 1 wherein the strontium composition after filling the mold, is sintered from 5 minutes to 15 minutes in an air/$CO_2$ environment.

6. The method of claim 1 wherein the strontium composition is acetone-wetted when initially introduced into the mold.

7. The method in claim 1 wherein the low pressure plasma sprayed backside structure is graded in composition having varying mechanical and thermophysical properties in different regions of the structure.

\* \* \* \* \*